United States Patent [19]

Voellmer

[11] Patent Number: 5,167,464
[45] Date of Patent: Dec. 1, 1992

[54] HIGH-REPEATABILITY, ROBOT FRIENDLY, ORU INTERFACE

[75] Inventor: George M. Voellmer, Takoma Park, Md.

[73] Assignee: The United States of America as represented by the Administrator of the Natoinal Aeronautics and Space Administration, Washington, D.C.

[21] Appl. No.: 772,200

[22] Filed: Oct. 7, 1991

[51] Int. Cl.$^5$ .............................................. F16B 5/02
[52] U.S. Cl. ........................................ 403/13; 403/24; 403/337; 33/645; 244/161
[58] Field of Search ................... 403/13, 14, 24, 408.1, 403/291, 337; 439/66, 73, 74, 330, 359; 33/613; 244/158 R, 161

[56] References Cited

U.S. PATENT DOCUMENTS

| | | | |
|---|---|---|---|
| 2,507,806 | 5/1950 | Mortimer | 248/18 |
| 2,805,404 | 9/1957 | Oakes | 339/66 |
| 3,808,577 | 4/1974 | Mathauser | 339/12 R |
| 4,232,497 | 11/1980 | Meschnig | 52/506 |
| 4,607,815 | 8/1986 | Turci et al. | 244/161 |
| 4,615,688 | 10/1986 | Schneider | 464/93 |
| 4,867,595 | 9/1989 | Hoffman | 403/13 |
| 4,948,369 | 8/1990 | Braccio et al. | 439/347 |
| 4,964,596 | 10/1990 | Ganssle et al. | 244/161 |
| 5,040,749 | 8/1991 | Johnson | 244/161 |

Primary Examiner—Randolph A. Reese
Assistant Examiner—Harry C. Kim
Attorney, Agent, or Firm—R. Dennis Marchant; Guy M. Miller; Paul S. Clohan, Jr.

[57] ABSTRACT

A robot-friendly coupling device for an Orbital Replacement Unit (ORU). The invention will provide a coupling that is detached and attached remotely by a robot. The design of the coupling must allow for slight misalignments, over torque protection, and precision placement. This is accomplished by using of a triangular interface having three components. A base plate assembly is located on an attachment surface, such as a satellite. The base plate assembly has a cup member, a slotted member, and a post member. The ORU that the robot attaches to the base plate assembly has an ORU plate assembly with two cone members and a post member which mate to the base plate assembly. As the two plates approach one another, one cone member of the ORU plate assembly only has to be placed accurately enough to fall into the cup member of the base plate assembly. The cup forces alignment until a second cone falls into a slotted member which provides final alignment. A single bolt is used to attach the two plates. Two deflecting plates are attached to the backs of the plates. When pressure is applied to the center of the deflecting plates, the force is distributed preventing the ORU & base plates from deflecting. This accounts for precision in the placement of the article.

7 Claims, 5 Drawing Sheets

HIGH-REPEATABILITY, ROBOT FRIENDLY, ORU INTERFACE

ORIGIN OF THE INVENTION

The invention described herein was made by an employee of the United States Government, and may be manufactured and used by or for the Government for governmental purposes without the payment of any royalties thereon or therefor.

TECHNICAL FIELD

This invention relates to coupling mechanisms and in particular to coupling mechanisms specifically directed to attachment of Orbital Replacement Units.

BACKGROUND ART

The potential for servicing satellites in orbit in order to lengthen their useful lives and to upgrade or change their function has been of paramount importance to the United States space program for some time. Equipment that provides for major spacecraft functions can be housed in modules, commonly known as Orbital Replacement Units (ORU's), that can be attached and detached, as needed. The current trend is toward dependence on robotic rather than astronaut activity and places exacting demands on the mechanisms that interconnect the modules to the structures that carry them. The attachment mechanisms must interface with the robot's arm to insure alignment, provide a stable mount for delicate instruments, and act as a path for the flow of electricity, data and fluids, while maintaining simplicity or operation.

STATEMENT OF THE INVENTION

It is therefore an object of the present invention to provide a highly repeatable, mechanical interface between an ORU and its base structure.

A further object of the invention is to provide an ORU coupling that has a high degree of repeatability and that does not require precise positioning of the interface to accomplish this, making the device robot-friendly.

These and other objects are achieved by providing a robot-friendly coupling device for an Orbital Replacement Unit (ORU). The invention will provide a coupling that is detached and attached remotely by a robot. The design of the coupling must allow for slight misalignments, over torque protection, and precision placement. This is accomplished by means of a triangular interface comprising three components. A base plate assembly is located on an attachment surface, such as a satellite. The base plate assembly has a cup member, a slotted member, and a post member. The ORU that the robot attaches to the base plate assembly has an ORU plate assembly with two cone members and a post member which mate to the base plate assembly. As the two plate assemblies approach one another, one cone member of the ORU plate assembly only has to be placed accurately enough to fall into the cup member of the base plate assembly. The cup forces alignment until a second cone falls into a slotted member which provides final alignment. A single bolt is used to attach the two plate assemblies. Two elastic plates are attached to the backs of two rigid plates. When pressure is applied to the center of the elastic plates, the force is distributed preventing the rigid plates from deflecting. This accounts for precision in the placement of the article.

DETAILED DESCRIPTION OF THE INVENTION

Figure 1:
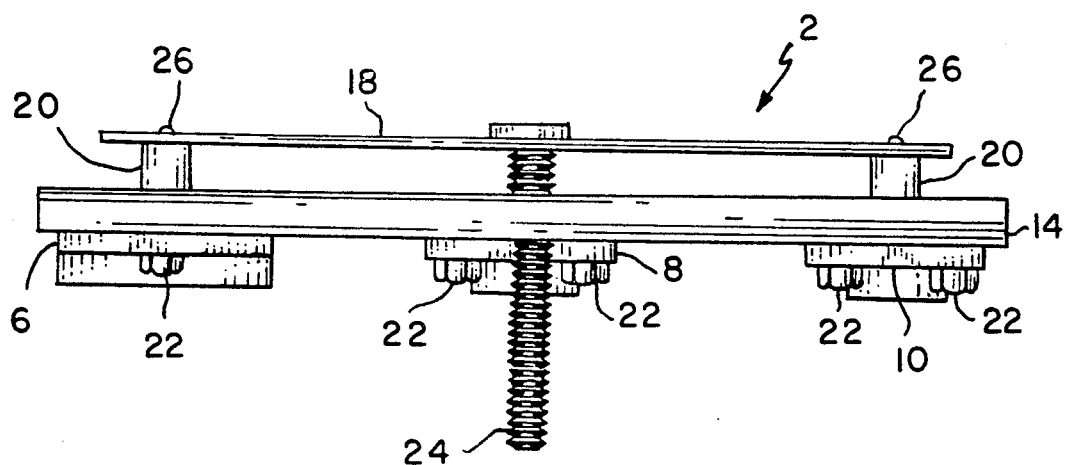
FIG. 1 is a front view of a base plate assembly.

Referring now to FIG. 1, a front view of a base plate assembly 2 is shown. The high-repeatability, robot friendly, ORU interface will consist of this base plate assembly 2 and an ORU plate assembly, to be described later. The base plate assembly consists of a rigid plate 14 which has affixed to it a slotted member 6, a post member 8, and a cup member 10 attached in a triangular configuration. This will be apparent later on. On top of rigid plate 14 is an elastic plate 18, mounted above rigid plate 14 by three standoffs 20 and affixed to rigid plate 14 by three bolts 26 (only two of the three bolts are seen in this view). Rigid plate 14 is typically a rigid aluminum plate located on an attachment surface such as a satellite, and elastic plate 18 is typically a thin spring plate capable of a moderate degree of deformation (e.g., a spring steel plate), to be explained later. Base plate assembly 2 also has a holddown bolt 24 affixed to elastic plate 18 at its center position. In this embodiment, slotted member 6, post member 8, and cup member 10 are each attached to rigid plate 14 by bolts 22, however any suitable attachment method is possible.

Figure 2:
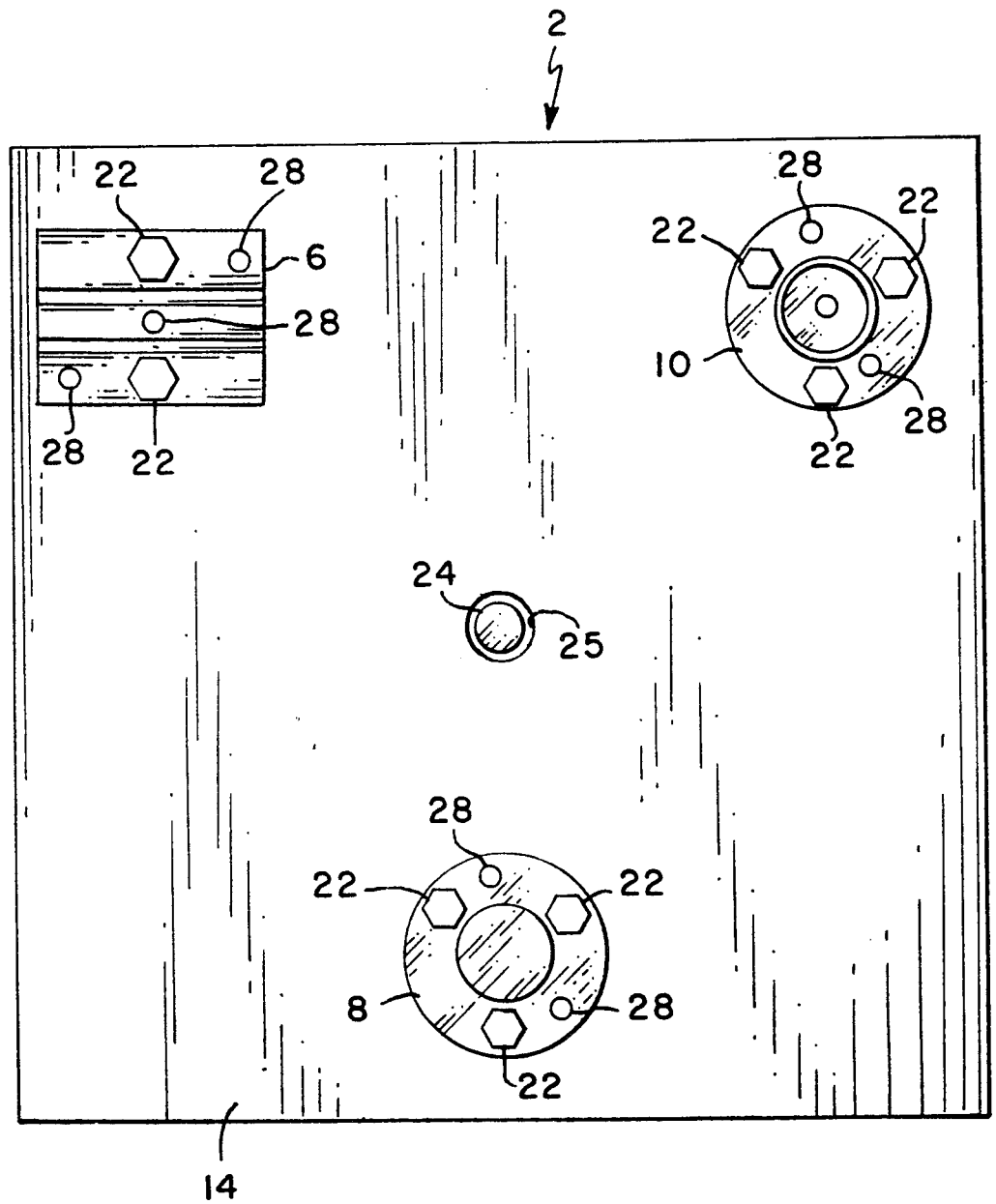
FIG. 2 is a bottom view of the base plate assembly shown in FIG. 1.

FIG. 2, which is a bottom view of base plate assembly 2 shown in FIG. 1, clearly shows the triangular mounting scheme of slotted member 6, post member 8, and cup member 10 on rigid plate 14. As shown, these members are affixed to rigid plate 14 by bolts 22, however, other attachment methods would be suitable. In addition to the bolts 22, the three members 6, 8, & 10 are also located by pins 28, but pins 28 may or may not be needed depending upon the method of attachment chosen for members 6, 8 and 10. Also shown in FIG. 2 is hole 25 in rigid plate 14 which allows holddown bolt 24 to pass through rigid plate 14; i.e., bolt 24 is not attached in any way to rigid plate 14.

Figure 3:
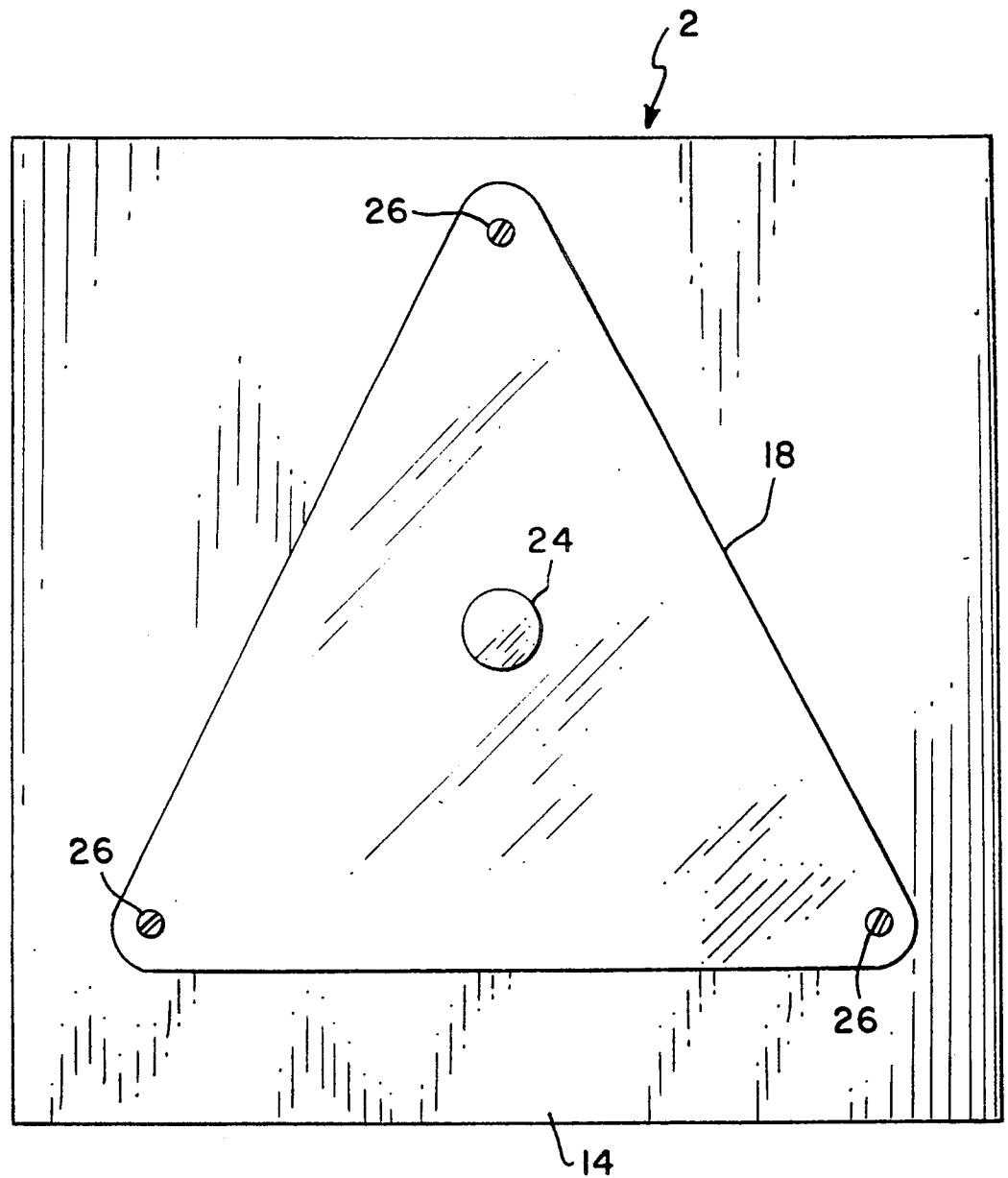
FIG. 3 is a top view of the base plate assembly shown in FIG. 1.

FIG. 3, which is a top view of base plate assembly 2 shown in FIG. 1, clearly shows the triangular shape of elastic plate 18. Also shown are the three bolts 26 which affix elastic plate 18 to standoffs 20 and ultimately to rigid plate 14; other methods of attachment are also suitable. Holddown bolt 24 is mounted in the center of elastic plate 18 and permanently attached to elastic plate 18 by any suitable method well known in the art.

Figure 5:
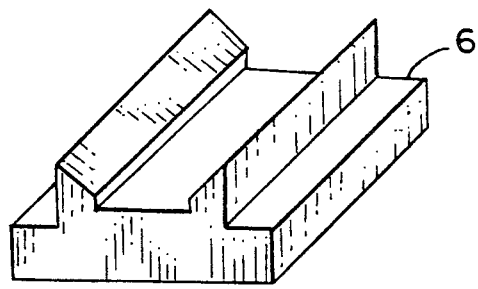
FIG. 5 is a perspective view of a slotted member used in the base plate assembly shown in FIG. 1.
Figure 6:
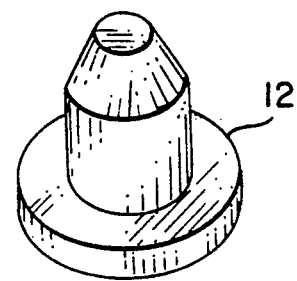
FIG. 6 is a perspective view of a cone member used in the ORU plate assembly shown in FIG. 4.
Figure 7:
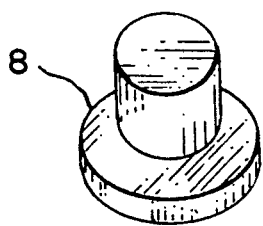
FIG. 7 is a perspective view of a post member used in both the ORU plate assembly and base plate assembly.
Figure 8:
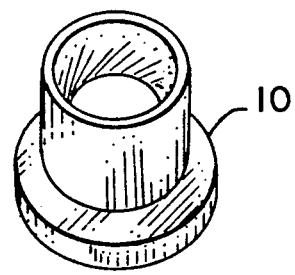
FIG. 8 is a perspective view of a cup member used in the base plate assembly shown in FIG. 1.

FIGS. 5, 6, 7 and 8 detail the various members attached to the two plates. In FIG. 5, a perspective view is shown of slotted member 6, used on base plate assembly 2 shown in FIG. 1. In FIG. 6, a perspective view is shown of cone member 12, used in two places on ORU plate assembly 4 shown in FIG. 4. In FIG. 7, a perspective view is shown of post member 8, used on both base plate assembly 2 and ORU plate assembly 4. And in FIG. 8, a perspective view is shown of cup member 10, used on base plate assembly 2. These members are each made from a suitable material, such as anodized aluminum. Those skilled in the art will recognize these members as standard kinematic mount members, and the drawings are thus self explanatory in this regard.

Figure 4:
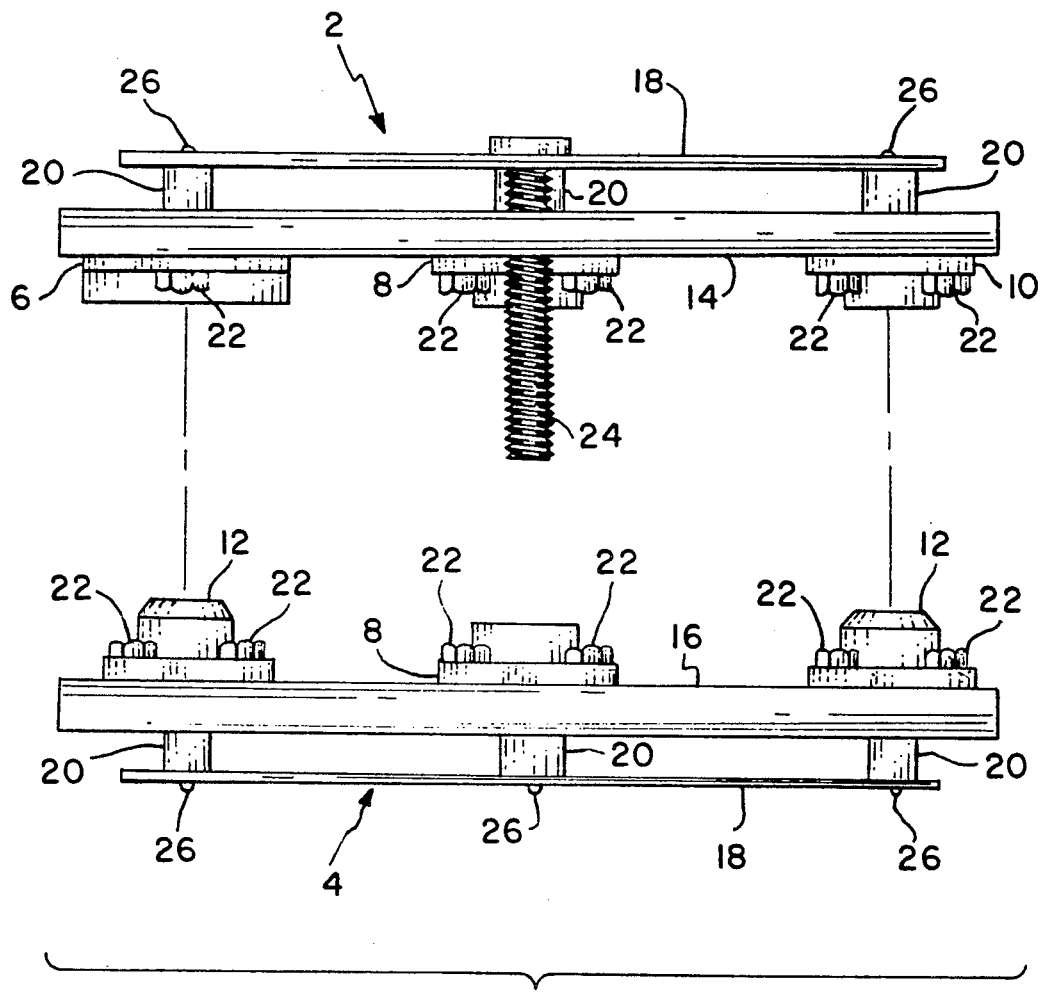
FIG. 4 is a front view of the base plate assembly shown in FIG. 1 in close proximity to an ORU plate assembly.

The triangular mounting of slotted member 6, post member 8, and cup member 10 on rigid plate 14 provides a standard kinematic mount, shown in FIG. 4, which is a front view of the base plate assembly 2 in close proximity to ORU plate assembly 4. This arrangement allows for high repeatability with a reasonable capture range. The method of preloading the resulting interface of ORU plate assembly 4 with base plate assembly 2 is critical, if very high repeatabilities are required. Bolting the two plate assemblies together through the middle would not be suitable as this would permanently deflect the two plates. Therefore, the two flexible, triangular elastic plates 18 are incorporated into the design of the high-repeatability, robot friendly, ORU interface. The corners of elastic plates 18 mount to standoffs 20 at the back ends of the kinematic mounts on both rigid plates 14 and 16. Therefore, when a preload force is applied near the centers of these elastic plates, they transmit a compressive force directly to the kinematic mount points, leaving the remaining portions of the rigid plates free from stresses and ensuing deflections. These elastic plates can be deflected significantly without producing any stress or deflection in the two rigid plates 14 and 16.

Figure 9:
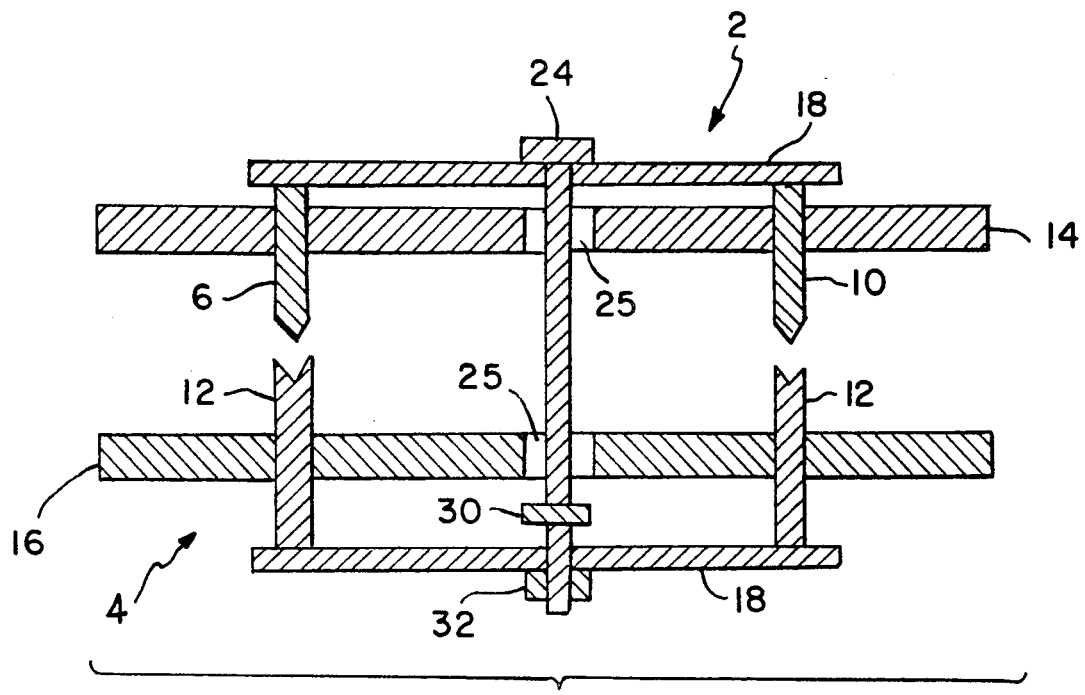
FIG. 9 is a schematic of the coupling of the ORU plate assembly to the base plate assembly prior to preloading.
Figure 10:
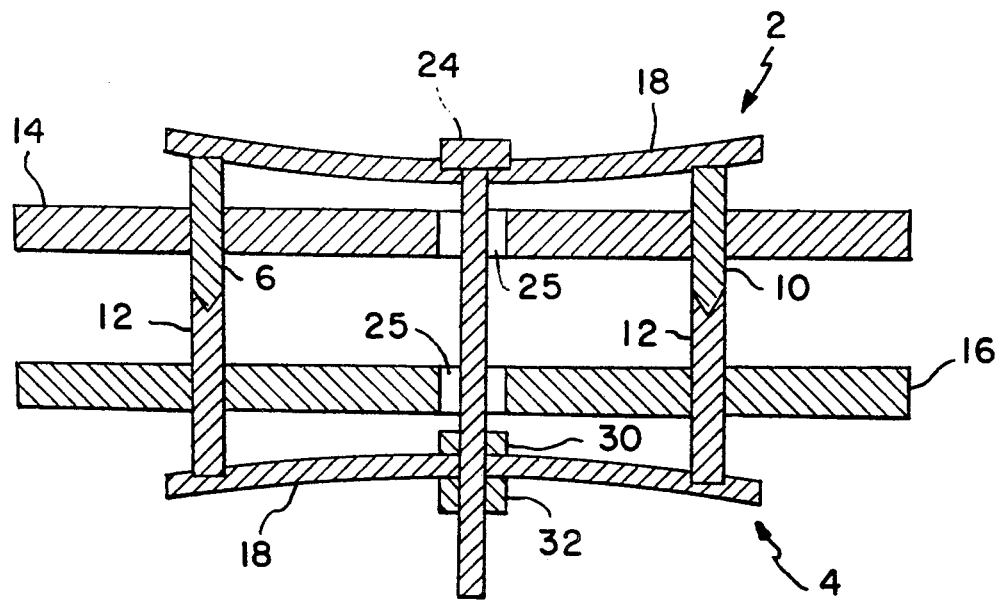
FIG. 10 is a schematic of the coupling of the ORU plate assembly to the base plate assembly after preloading.

In order to achieve a precise preload with an imprecise torque on a screw fastener, the following system, shown schematically in FIGS. 9 and 10, is used: The two plate assemblies 2 and 4 are brought into close proximity as shown in FIGS. 4 and 9. Holddown bolt 24 now extends beyond elastic plate 18 of ORU plate assembly 4. The kinematic alignment members are brought together and form a kinematic mount as described above. In this configuration, a stop collar 30 on holddown bolt 24 extends beyond rigid plate 16 but not as far as the lower elastic plate 18. A nut 32 is threaded onto holddown bolt 24 and is tightened, which pulls the centers of the two elastic plates 18 together, as shown in FIG. 10. Stop collar 30 limits the distance that the two elastic plates 18 can be compressed. The driving torque has to be sufficient to ensure that stop collar 30 has been reached, but overtorque simply compresses nut 32 against stop collar 30, without increasing the preload on rigid plates 14 and 16. When this is accomplished, a high-repeatability, robot friendly, ORU interface has been formed which will be repeatable to ±40 millionths of an inch in the X, Y, and Z direction.

An alternate method for compression of elastic plates 18 would be to mount a floating nut 32 to the center of elastic plate 18 on ORU plate assembly 4. Since there is a hole in the center rigid plate 14, rigid plate 16, and elastic plates 18, a bolt could be passed through these holes to engage the floating nut on elastic plate 18 or ORU plate assembly 4. Engaging this bolt in the floating nut and tightening it would pull the centers of the two elastic plates 18 together, as above, without contacting the rigid plates 14 and 16. A stop or shoulder on the bolt at a certain point would limit the distance that the two elastic plates could be compressed.

To those skilled in the art, many modifications and variations of the present invention are possible in light of the above teachings. It is therefore to be understood that the present invention can be practiced otherwise than as specifically described herein and still will be within the spirit and scope of the appended claims.

I claim:

1. A coupling device for joining two items comprising:
   a first rigid plate member having a first side and an opposite second side and having a first set of three kinematic mount members located on said first side of said first rigid plate member in a triangular position, and a first elastic plate member mounted on said second side of said first rigid plate member;
   a second rigid plate member also having a first side and an opposite second side and having a second set of three kinematic mount members located on said first side of said second rigid plate member in a triangular position, and a second elastic plate member mounted on said second side of said second rigid plate member;
   said first and second set of kinematic mount members providing gross and fine alignment of said first and second rigid plate members when said first and second set of kinematic mount members are brought into contact with each other; and
   means for compressing said first and second elastic plate members so as to transmit a compressive force upon said first and second set of kinematic mount members when they are in contact with each other.

2. The device of claim 1 wherein said first set of three kinematic mount members comprises one member having a slot, one member having a cup, and one member having a post and said second set of three kinematic mount members comprises one member having a post and two members having a cone.

3. The device of claim 2 whereby the contact of said kinematic mount members having a cup with one of said kinematic members having a cone provides the gross alignment of said first and second rigid plate members, the contact of said kinematic mount member having a slot with said kinematic member having a cone provides fine alignment of said first and second rigid plate members, and the contact of said kinematic members having a post provides stability of said first and second rigid plate members.

4. The device of claim 3 wherein said first and second elastic plate members are mounted to said rigid plate members with standoffs.

5. The device of claim 4 wherein said first and second elastic plate members are each a thin spring plate capable of a moderate degree of deformation.

6. The device of claim 5 wherein said means for compressing said first and second elastic plate members comprises a bolt and nut with a stop collar on said bolt to limit the compression of said elastic plate members.

7. The device of claim 5 wherein said means for compressing said first and second elastic plate members comprises a floating nut located on said first elastic plate member and a bolt with a stop on said bolt to limit the compression of said elastic plate members.

* * * * *